United States Patent
Renaud

(10) Patent No.: US 6,283,522 B1
(45) Date of Patent: Sep. 4, 2001

(54) DETACHABLE AND ADJUSTABLE AUXILIARY HANDLE FOR A LONG-HANDLED MATERIAL-MOVING TOOL

(75) Inventor: Mark Leslie Renaud, Windsor (CA)

(73) Assignee: Mark L. Renaud, Windsor ( * ) Notice: Subject to any disclaimer, the term of this patent is extended or adjusted under 35 U.S.C. 154(b) by 0 days.

(21) Appl. No.: 09/118,965

(22) Filed: Jul. 20, 1998

(51) Int. Cl.$^7$ ................... A01B 1/22; B25G 3/38
(52) U.S. Cl. ............................ 294/58; 16/114 R
(58) Field of Search .............. 294/54.5, 57–59, 294/131.5; 15/145; 16/111 R, 112, 114 R, 115; 37/265, 285

(56) References Cited

U.S. PATENT DOCUMENTS

| | | | | |
|---|---|---|---|---|
| 911,291 | * | 2/1909 | Byor | 294/58 |
| 4,050,728 | * | 9/1977 | Davidson | 294/58 |
| 4,264,096 | * | 4/1981 | Barnett | 294/58 |
| 5,447,349 | * | 9/1995 | Coble | 294/58 |
| 5,496,085 | * | 3/1996 | Middleton | 294/58 |

* cited by examiner

Primary Examiner—Johnny D. Cherry

(57) ABSTRACT

A detachable and adjustable auxiliary handle for a long-handled material-moving tool that includes a swiveling hand grip attached to an outer section of lightweight galvanized tubing, housing an inner section of lightweight galvanized tubing, that is adjustable in length by inserting a push pin through the outer tubing into any one of a plurality of through holes in the inner tubing. The inner tubing has a tube fitting at the bottom to be pivotly attached to a swiveling u-shaped form, connecting the downward directed bolt of the u-shaped form to a coupling nut that is welded to the top of the base of a standard muffler clamp. The base portion of the muffler clamp is then attached with the threaded u-bolt of the muffler clamp and then fastened to the lower end of a long-handled material-moving tool. The swivel action of the hand grip and u-shaped form, along with the adjustable and pivotable tubing, relieves the strain on ones back, wrist, and forearm while shovelling.

3 Claims, 1 Drawing Sheet

DETACHABLE AND ADJUSTABLE AUXILIARY HANDLE FOR A LONG-HANDLED MATERIAL-MOVING TOOL

BACKGROUND OF THE INVENTION

This invention relates to a detachable and adjustable auxiliary handle for a long-handled, material moving tool such as a shovel which substantially reduces the amount of stooping the user typically does when using a shovel to relieve strain on one's back and also designed to swivel to relieve strain on one's wrist and forearm.

DESCRIPTION OF THE PRIOR ART

To relocate an intended load of dirt, gravel, snow etc., by hand, the common shovel has proven to be the most practical way to relocate materials, but continual or repetitive use of the tool can be very strenuous on one's back, wrist, and forearm. While people still use the shovel in the ordinary fashion, efforts have been made to make the task less strenuous. Auxiliary handles have been employed in different forms to assist in the lifting of an intended load in which the auxiliary handle is attached to the long handle to reduce the distance of reach needed to pick up a load of material as shown in U.S. Pat. Nos. 5,669,650; 5,400,471; 5,331,720; 4,690,447; 4,155,582; 4,128,266; 3,751,094; 2,653,406; 2,520,606; 2,416,414; 1,524,168; 1,449,702; 933,647; 875,504; 758,482; and 304,067. While it appears that great time and effort was applied to the prior auxiliary handles in respect to the assisting in the lifting of the load, the same cannot be said in the relocation or dumping of the load. When dumping a load in a sideways fashion, over the side of a wheel barrow or the side of a utility trailer, the operator will find it difficult to unload the material if the auxiliary handle is unable to swivel and pivot, subjecting the operator to continually rotate the wrist and forearm to the underneath position. When the auxiliary handle is able to swivel and pivot, the forward hand that bares the load is prevented from going to the underneath position when dumping the load, reducing total rotation of the wrist and forearm, even when the shovel is turned upside down, all the while maintaining the lifting force needed. The prior art does not describe or suggest an auxiliary handle which can quickly and easily be attached and detached, be adjustable in length, swivel and pivot upon the handle of a long handled, material moving tool, without any adjustment or modification to the long handled implement. An example of modification or adjustment to a long handled implement to perform certain duties can be found in U.S. Pat. No. 3,751,094. Shown in FIG. 1, this auxiliary handle enables the operator to bend over less, but fails to offer any other features. In FIG. 3, this auxiliary handle shows a modified long handled implement that has certain disadvantages and complications. For instance, Reference Character 35 shows that a pin can be inserted through any of the holes 37 to adjust for vertical lift of bars 31 and 32. The problem with this is the more vertical the bar 31 becomes, loss of gripping force will be inevitable as the hand will slide up the bar, especially when lifting heavy loads. To grab at the pivot point would be very uncomfortable, and to grab bar 32 the operator has lost his lifting force. Again in FIG. 3, this auxiliary handle is showing at Reference Characters 25 and 26 that the handle 24 is able to be rotated when the operator dumps the material in a sideways fashion. To accomplish this, pin 35 has to be removed and at some point during the loading and unloading of the material, sleeve 26 is going to travel backwards against the operator's hand, injuring the hand. To re-insert the pin 35 in one of the empty holes behind sleeve 26 to stop the backward movement, the pin will eventually wear a groove or notch in the sleeve or wear out the pin, subjecting the intended operation to fail. Also, continual use in this manner is going to wear on the long handled implement because of the rotation of sleeve 26.

To solve the problems of the prior auxiliary handles, it had to be understood that picking up a load of material and pitching it forward was not the only operation consistent with shovelling, and that lifting a load of material up and over to the side, or as in some areas of construction, digging below ground level, is a common function.

SUMMARY OF THE INVENTION

The applicant provides an improved detachable and adjustable auxiliary handle for a long-handled material moving tool which is designed specifically to relieve strain on ones back, wrist and forearm while shovelling. This invention is comprised of an inner and outer section of light weight tubing in which the inner tubing slides inside the outer tubing to provide an adjustable tube to be set at different lengths by inserting a self locking push pin through the outer tubing into any one of the many height adjustment holes in the inner tubing. The inner tubing is equipped with a tube fitting that has a through hole, and is fixedly attached to the bottom of the tubing to be engaged by a pivot bolt that passes through the uprights of a "U"-shaped form. This "U"-shaped form also has a hole in the base of it to allow a bolt to pass through downward, and is secured in place with a lock washer and nut. This bolt threads into a coupling nut that is welded to the base of a standard muffler clamp, creating the swivel action. The threaded u-bolt of the muffler clamp then attaches to the base of the muffler clamp and is positioned at the lower end of the shovel handle and tightened. Additional swivel action is provided at the base of the hand grip, at the top of the auxiliary handle. A hole in the base of the hand grip allows a bolt to pass through downward, and is secured in place with a lock washer and nut. A t-nut is welded to the top of the outer tubing, creating the swivel. In between shovelling, the auxiliary handle is held against the long handle by a gripper clip that is fixedly attached to the long handle.

It is accordingly an object of the present invention to provide an improved detachable and adjustable auxiliary handle for a long-handled material moving tool.

It is another object of this invention to be able to operate this device from below ground level.

It is a further object of this invention to relieve strain on one's back while shovelling.

It is yet another object of this invention to relieve strain on one's wrist and forearm while shovelling.

It is still another object of this invention to be able to adjust this device to accommodate people of different statures.

It is further-more another object of this invention to provide unrestricted operation of this device.

It is finally another object of this invention to not have to modify the long-handled material-moving tool to accommodate the detachable and adjustable auxiliary handle.

Further objectives and advantages of the present invention will become apparent as the description proceeds and when taken in conjunction with the accompanying drawings wherein:

DETAILED DESCRIPTION OF THE INVENTION

Figure 2:
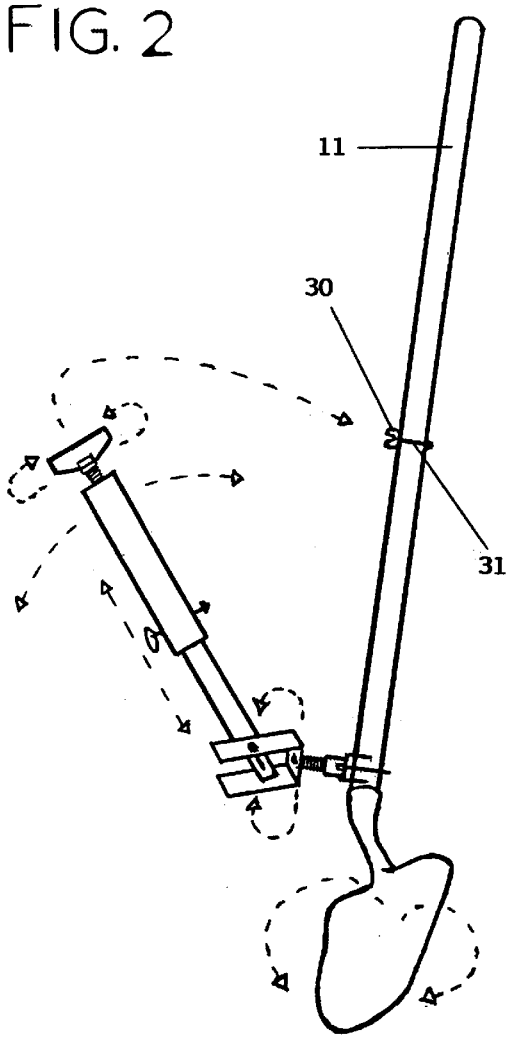
FIG. 2 is a perspective view of the detachable and adjustable auxiliary handle for a long-handled material-moving tool fastened to the handle shaft of a shovel.
Figure 1:
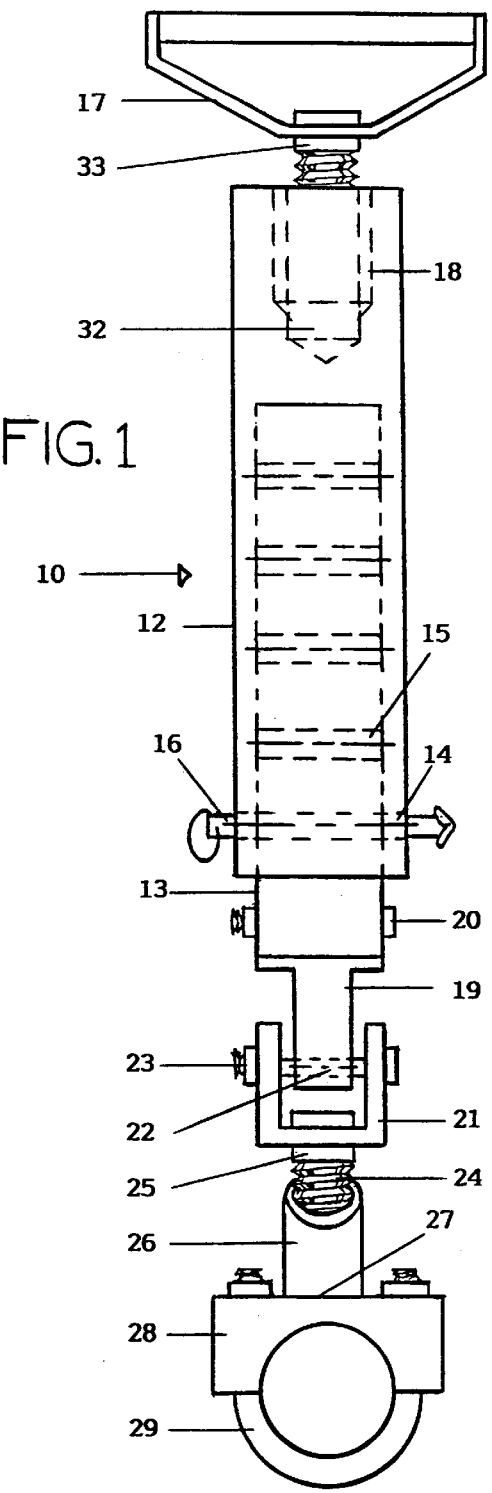
FIG. 1 is a perspective view of the detachable and adjustable auxiliary handle for a long-handled material-moving tool.

With further reference to the drawings, FIGS. 1 and 2, the detachable and adjustable auxiliary handle device of the present invention is shown therein, indicated generally by the numeral 10.

The detachable and adjustable auxiliary handle for a long-handled material-moving tool is comprised of two sections of light weight galvanized tubing in which the outer tubing 12 is approximately fourteen inches long, a wall thickness of approximately fifty thousandths of an inch, and an outside diameter of one inch. The inner section of tubing 13 is approximately ten inches long, a wall thickness of approximately fifty thousandths of an inch, and an outside diameter of seven eights of an inch, and slides inside the outer tubing 12. Both sections of tubing have through holes drilled into the side of the tubing, a single hole 14 located near the bottom of the outer tubing, and a series of holes 15 located every two inches in the inner tubing. A self locking push pin 16 inserted through these holes allows the operator to set the overall length of the auxiliary handle 10 to his or her comfort. The outer tubing 12 has a hand grip 17 swivelling atop by means of a bolt 32 that passes downward through the base of the hand grip 17 into a t-nut 18 that is welded to the top of the outer tubing 12. Bolt 32 is secured in place by a lock washer and nut 33. A tube fitting 19 is fixedly attached to the bottom of the inner tubing 13 with a bolt and lock nut 20. A steel strip, one inch wide, one eight of an inch thick, and two and a half inches in length, is bent ninety degrees left and right, leaving an opening of half an inch in between the uprights, creating a u-shape form 21. A through hole 22 is provided to allow a bolt 23 to pass through the tube fitting 19 allowing the auxiliary handle 10 to pivot. This u-shaped form 21 also has a through hole in the base of it to allow a bolt 24 to pass through downward, and is secured in place with a lock washer and nut 25. This bolt 24 threads into a coupling nut 26 that is welded at 27 to the base 28 of a standard muffler clamp. The threaded u-bolt 29 of the muffler clamp then attaches to the base of the muffler clamp and is positioned on the lower end of the shovel handle 11 and tightened. In between shovelling, the auxiliary handle 10 is held in place by a gripper clip 30 and the gripper clip is held in place by an adjustable standard hose clamp 31.

To use the auxiliary handle 10, the operator attaches the auxiliary handle to the lower end of the shovel handle 11 and positions the gripper clip 30 several inches up the shovel handle 11 and secures it in place with the adjustable hose clamp 31. Adjusting tubing 12 and 13 to the operator's comfort, the operator secures the adjustment with the self locking push pin 16. Now the operator will shovel in the normal fashion and find that the combination of swiveling and pivoting at the lower end, vertical height adjustment, and swiveling of the upper end of the auxiliary handle 10, strain on one's back, wrist, and forearm has been drastically reduced.

While a particular example of the present invention has been shown and described, it is apparent that changes and modifications may be made therein without departing from the invention in it's broadest aspects. The aim of the appended claims therefore is to cover all such changes and modifications as fall within the true spirit and scope of the invention.

What is claimed is:

1. A detachable and adjustable auxiliary handle for a long-handled, material-moving tool comprising:

a removable u-shaped clamp attached to the lower portion of a long-handled material-moving tool, said u-shaped clamp having a top base portion, said top base portion having a coupling nut affixed centrally to the face extending upwardly, a u-shaped form having a through hole in the base to accept a downward directed swivel bolt to connect to said coupling nut, said u-shaped form having a pivot hole in the sides of the uprights;

an inner section of tubing having a tube fitting fixed to the lower end to pivot within the said uprights of the said u-shaped form by means of a pivot bolt;

a plurality of through holes spaced along the length of said inner section of tubing, an outer section of tubing having a single through hole located near the bottom of the tubing to engage any one of said plurality of through holes in the inner tubing by means of a self locking push pin to create an adjustable tube;

a t-nut affixed to the top of the said outer tubing, a hand grip having a through hole in the base to accept a downward directed swivel bolt to connect to the said t-nut;

an adjustably fastened gripper clip positioned on the long-handled material moving tool to intermittently accept said hand grip.

2. The combination as set forth in claim 1 wherein the said detachable and adjustable auxiliary handle swivels at the said hand grip and said u-shaped form at any adjustable setting of the said inner and outer tubing.

3. The combination as set forth in claim 1 or 2 wherein the said detachable and adjustable auxiliary handle swivels at the said hand grip and the said u-shaped form and also pivots within the u-shaped form at any adjustable setting of the said inner and outer tubing.

* * * * *